United States Patent

Kamitsuma et al.

[11] Patent Number: 5,087,181
[45] Date of Patent: * Feb. 11, 1992

[54] SLIDING STRUCTURE SUCH AS COMPRESSOR OR THE LIKE

[75] Inventors: Yasuo Kamitsuma, Mito; Isao Ishi, Taga; Yusaku Nakagawa, Hitachi; Noriyuki Ohnaka, Katsuta; Tadashi Iizuka, Ashikaga; Kazushi Fukuda, Tochigi, all of Japan

[73] Assignee: Hitachi, Ltd., Tokyo, Japan

[*] Notice: The portion of the term of this patent subsequent to Jul. 31, 2007 has been disclaimed.

[21] Appl. No.: 489,191

[22] Filed: Mar. 6, 1990

[30] Foreign Application Priority Data

Mar. 6, 1989 [JP] Japan .................. 1-052110

[51] Int. Cl.⁵ .................. F04C 15/00; F04C 29/00; C04B 35/00
[52] U.S. Cl. .................. 418/178; 252/12.2; 92/223; 418/179; 148/16.6; 428/307.7
[58] Field of Search .................. 252/12, 12.2; 92/223; 418/178, 179; 148/16.6; 428/307.7, 216; 501/88, 103, 128, 96-98; 384/625, 297

[56] References Cited

U.S. PATENT DOCUMENTS

| | | | |
|---|---|---|---|
| 3,877,854 | 4/1975 | Sasame et al. | 418/178 |
| 4,115,283 | 9/1978 | Needham | 252/12.4 |
| 4,563,223 | 1/1986 | Dawes et al. | 148/16.6 |
| 4,579,355 | 4/1986 | Koorokí | 277/235 A |
| 4,776,901 | 10/1988 | Heminghous | 148/16.5 |
| 4,944,663 | 7/1990 | Iizuka et al. | 418/178 |

FOREIGN PATENT DOCUMENTS

| | | | |
|---|---|---|---|
| 55-4958 | 2/1980 | Japan . | |
| 58-19414 | 2/1983 | Japan . | |
| 58-37155 | 3/1983 | Japan . | |
| 58-183881 | 10/1983 | Japan . | |
| 59-20446 | 2/1984 | Japan . | |
| 60-73082 | 4/1985 | Japan . | |
| 61-34377 | 2/1986 | Japan . | |
| 61-36166 | 2/1986 | Japan . | |
| 61-58995 | 3/1986 | Japan | 418/178 |
| 62-3188 | 1/1987 | Japan | 418/178 |
| 62-13784 | 1/1987 | Japan . | |
| 62-32293 | 2/1987 | Japan | 418/179 |
| 2288182 | 12/1987 | Japan . | |
| 01-134093 | 5/1989 | Japan | 418/179 |

*Primary Examiner*—Richard A. Bertsch
*Assistant Examiner*—David L. Cavanaugh
*Attorney, Agent, or Firm*—Antonelli, Terry Stout & Kraus

[57] ABSTRACT

A sliding structure such as a compressor and etc. comprising a member made of an iron base material and another member having a porous ceramic layer slidably contacted with the iron base member, wherein the surface portion of the iron base member has both a porous oxide film containing tri-iron tetroxide as a main constituent, and an oxynitride layer formed under the oxide film.

27 Claims, 7 Drawing Sheets

| COMBINATION | | ANTI-SEIZURE STRESS (Kgf/cm$^2$) |
|---|---|---|
| MOVING PIECE | FIXED PIECE | 100  200  300  400  500 |
| PRIOR ART<br>EUTECTIC GRAPHITE CAST IRON | EUTECTIC GRAPHITE CAST IRON |  |
| THE PRESENT INVENTION<br>SPHEROIDAL GRAPHITE CAST IRON (TREATED BY OXYNITRIDING AND STEAM TREATMENTS) | α-Sic (VACANCY RATE 10%) |  |
| SPHEROIDAL GRAPHITE CAST IRON (TREATED BY OXYNITRIDING AND STEAM TREATMENTS) | β-Sic (VACANCY RATE 10%) |  |
| SPHEROIDAL GRAPHITE CAST IRON (TREATED BY OXYNITRIDING AND STEAM TREATMENTS) | ZIRCONIA (VACANCY RATE 10%) |  |
| SPHEROIDAL GRAPHITE CAST IRON (TREATED BY OXYNITRIDING AND STEAM TREATMENTS) | SILICON NITRIDE (VACANCY RATE 10%) |  |
| SPHEROIDAL GRAPHITE CAST IRON (TREATED BY OXYNITRIDING AND STEAM TREATMENTS) | BORON NITRIDE (VACANCY RATE 10%) |  |
| SPHEROIDAL GRAPHITE CAST IRON (TREATED BY OXYNITRIDING AND STEAM TREATMENTS) | ALUMINA (VACANCY RATE 10%) |  |
| SPHEROIDAL GRAPHITE CAST IRON (TREATED BY OXYNITRIDING AND STEAM TREATMENTS) | SIALON (VACANCY RATE 10%) |  |

FIG. 8

| COMBINATION | | WEAR VOLUME (mm³) |
|---|---|---|
| MOVING PIECE | FIXED PIECE | 2  4  6  8  10  12  14 |
| PRIOR ART | | |
| EUTECTIC GRAPHITE CAST IRON | EUTECTIC GRAPHITE CAST IRON | ▨▨▨▨▨▨▨ MOVING PIECE<br>▨▨▨▨ FIXED PIECE |
| THE PRESENT INVENTION | | |
| SPHEROIDAL GRAPHITE CAST IRON (TREATED BY OXYNITRIDING AND STEAM TREATMENTS) | α-SiC (VACANCY RATE 10%) | ▨▨ (2.3) |
| SPHEROIDAL GRAPHITE CAST IRON (TREATED BY OXYNITRIDING AND STEAM TREATMENTS) | β-SiC (VACANCY RATE 10%) | ▨ (0.8) |
| SPHEROIDAL GRAPHITE CAST IRON (TREATED BY OXYNITRIDING AND STEAM TREATMENTS) | ZIRCONIA (VACANCY RATE 10%) | ▨▨▨ (3.5) |
| SPHEROIDAL GRAPHITE CAST IRON (TREATED BY OXYNITRIDING AND STEAM TREATMENTS) | SILICON NITRIDE (VACANCY RATE 10%) | ▨▨ (2.6) |
| SPHEROIDAL GRAPHITE CAST IRON (TREATED BY OXYNITRIDING AND STEAM TREATMENTS) | BORON NITRIDE (VACANCY RATE 10%) | ▨▨▨ (3.5) |
| SPHEROIDAL GRAPHITE CAST IRON (TREATED BY OXYNITRIDING AND STEAM TREATMENTS) | ALUMINA (VACANCY RATE 10%) | ▨▨▨ (3.1) |
| SPHEROIDAL GRAPHITE CAST IRON (TREATED BY OXYNITRIDING AND STEAM TREATMENTS) | SIALON (VACANCY RATE 10%) | ▨▨ (2.5) |

SLIDING STRUCTURE SUCH AS COMPRESSOR OR THE LIKE

BACKGROUND OF THE INVENTION

The present invention relates to a sliding structure, and more particularly to a sliding structure such as a compressor or the like used in room air conditioners and refrigerations, and to a sliding structure of which sliding section is formed of a material combination that has wear resistance and high economic efficiency suitable for achieving high performance and high reliability.

There are a wide variety of compressors for use in room air conditioners and refrigerators, including a rotary type, a reciprocating type, a scroll type and a screw type. Above all, the typical one is a rotary compressor.

The rotary compressor comprises a crankshaft supported by upper and lower bearings jointly constituting a journal bearing, a roller eccentrically rotated by the crankshaft, a cylinder housing the roller therein, and a vane freely slidably disposed in a vane groove formed in the cylinder, the distal end of the vane being held in slidable contact with the outer periphery of the roller. The sliding members constituting the rotary compressor operate to compress Freon gas under lubrication by a refrigerating machine oil that is dissolving Freon gas. Those sliding members require appropriate lubricated conditions and wear resistance. Thus, it has been general in the conventional rotary compressor to employ iron base sliding members; specifically, the upper and lower bearings are formed of flaky graphite cast iron or an iron base sintered material, and the crankshaft is formed of eutectic graphite cast iron, or spheroidal graphite cast iron or flaky graphite cast iron.

Recently, however, there is a tendency toward a small-sized, high-output rotary compressor of rotational speed control type. This accompanies such fears that, under operation resorting to a lubrication oil film of a refrigerating machine oil of low viscosity diluted with Freon (trademark), a boundary lubrication region may be caused along with metal-to-metal contact occurring due to insufficient oil film existence during high-load, low-speed operation or during quick start operation, and that insufficient oil film existence may be accelerated due to an increase in the coefficient of friction and the amount of wear, as well as intrusion of worn material dust and fine foreign matters, thereby impairing reliability of the compressor over a long period of time.

In consideration of such fears, several improvements explained below have been proposed in the prior art to increase wear resistance of respective sliding members. However, each improvement has respective advantages and disadvantages in view of the other. That is, there is not yet found an optimum material combination that meets requirements of both wear resistance and productivity.

For example, Japanese Patent Publication No. 55-4958 discloses a rotary compressor using a combination of iron base sintered alloys such that a cylinder of cast iron and both or either one of a roller and a vane are subjected to soft nitriding. But, the soft nitriding of iron base sintered alloys in the form of porous material develops a so large configurative deformation that vacancies, pores and nitrides cause the notch effect, which results in a problem of strength.

Japanese Patent Laid-Open No. 60-73082 discloses such a combination that the inner surface of a cylinder is formed of an iron base sintered alloy containing iron oxide of 10-40 volume %, while a roller and a vane are formed of an iron base sintered alloy in which metal carbide and metal oxide are dispersed in the matrix produced by tempering martensite, and nitrogen is contained in the matrix in solid-solution state. But, this materials combination is significantly inferior in strength to a conventional material produced by a melting method, when used for a vane of a compressor of small-sized, high-output high-functional, high-performance type.

Japanese Patent Laid-Open No. 62-13784 discloses a crankshaft which is immersed in a salt bath mainly including alkali metal cyanate to form a porous layer of iron nitride containing iron sulfide and an underlying alloy layer of iron nitride disposed thereunder. But, this is disadvantageous as follows. The salt bath components of high toxicity enter hollow portions and oil bores of the crankshaft and are apt to remain there as washing residue. The step of making resultant waste liquid harmless is required, which remarkably degrades productivity and economical efficiency. Furthermore, in the case of a member which needs control of high dimensional accuracy, correction machining is required to ensure the dimension after treatment.

In addition, Japanese Patent Laid-Open No. 61-36166 discloses a sliding member of which sliding face is formed of ceramic. Specifically, the sliding member is made of a material containing alumina as a main constituent and zirconia of 5-50 weight % or inorganic fibers of 5-50 weight % mixed therewith. In the ceramic of $Al_2O_3$ mixed with zirconia, however, nonstabilized zirconia converts from the tetragonal system to the monoclinic system due to transformation and expansion, thereby causing a great number of fine cracks inside the alumina sintered material. This results in a problem of strength and hence makes it difficult to use the alumina sintered material as a sliding member for high load.

In the above-mentioned prior art it is not taken into consideration to obtain sliding members of high strength used for driving a small-sized, high output, high-performance compressor, while fully satisfying all of the following requirement: sufficient mechanical strength; sufficient oil-retainability, compatibility and wear resistance under the boundary lubrication conditions caused by a refrigerating machine oil of low viscosity diluted with Freon; improving the problem of washing the salt bath components adhered; and enhancing production efficiency of a complex post-steps such as machining to final size. Thus, these points are still left unsolved. Further, a compressor using Freon has had many problems in increasing the strength of a material of sliding members to cope with tendency toward smaller size and higher performance, enhancing the mechanical performance such as mechanical loss and volume efficiency of the compressor, improving reliability of operation over a long period of time, and suppressing the production cost.

Although the problems have been explained especially for the rotary compressor as a typical one of various compressors, the similar problems are also encountered in other compressors of reciprocating type, scroll type and screw type, for example.

SUMMARY OF THE INVENTION

It is an object of the present invention to improve the foregoing problems in the prior art, to achieve smaller size and higher performance, to enhance the mechanical performance, to improve reliability over a long period of time, to increase production efficiency, and to lower the production cost of a sliding structure for a compressor or the like.

A sliding structure of the present invention for achieving the object comprises a member made of an iron base material and another member having a porous ceramic layer slidably contacted with the iron base member, the iron base member being provided on the surface portion thereof with a porous oxide film containing tri-iron tetroxide as a main constituent thereof, and an oxynitride layer formed under the oxide film.

In this specification, the term "Oxynitride layer" means a layer consisting of a nitride layer integral with an iron base substrate, and a mixture layer of a mixture of nitride and oxide which mixture layer is integral with the nitride layer on its side opposite to the iron base substrate.

A compressor of the present invention for achieving the object comprises a shaft made of an iron base material, compressing means for effecting compression action which means is coupled to the shaft, and a bearing for rotatably supporting the shaft, the shaft being provided on the surface portion thereof with a porous oxide film containing tri-iron tetroxide as a main constituent thereof, and an oxynitride layer formed under the oxide film, the bearing being provided with a sliding face formed of a porous ceramic layer.

A rotary compressor of the present invention for achieving the object comprises a crankshaft supported between upper and lower bearing portions of journal bearing, a roller eccentrically rotated by the crankshaft, a cylinder housing the roller therein, and a vane freely slidably disposed in a vane groove formed in the cylinder, the distal end of the vane being held in slidable contact with the outer periphery of the roller, the crankshaft being made of an iron base material and being provided on the surface portion thereof with a porous oxide film containing tri-iron tetroxide as a main constituent thereof, and an oxynitride layer formed under the oxide film, the bearing for the crankshaft being provided with a sliding face formed of a porous ceramic layer.

The constitution of the present invention will be explained below in more detail.

Figure 4:
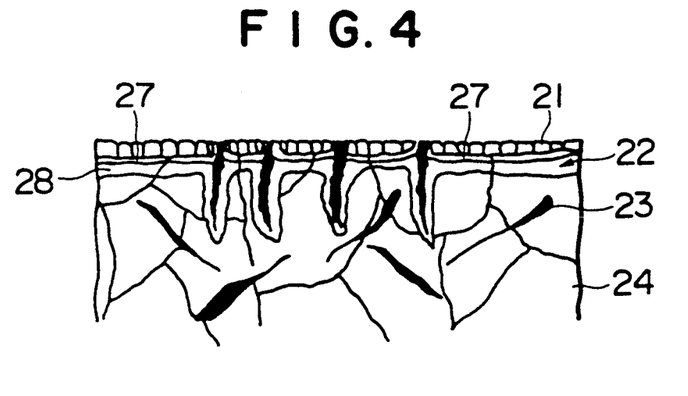
FIG. 4 is a sectional view showing a tri-iron tetroxide layer, an oxynitride layer and a substrate of flaky graphite cast iron.
Figure 5:
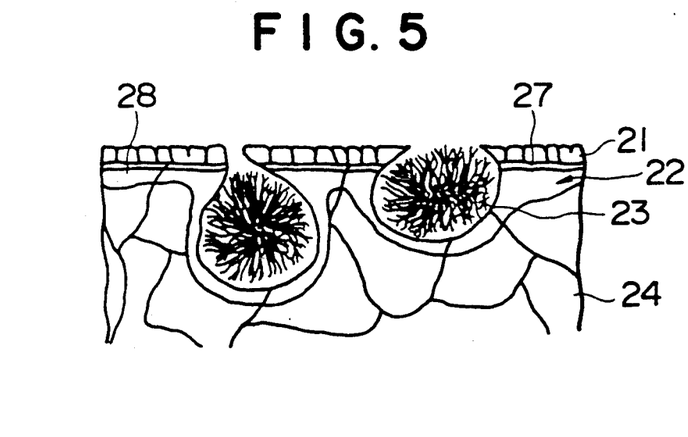
FIG. 5 is a sectional view showing a tri-iron tetroxide layer and an oxynitride layer both formed on a shaft substrate portion of spheroidal graphite cast iron.

A conventional iron base sliding material produced by a melting method, such as flaky graphite cast iron, eutectic graphite cast iron, spheroidal graphite cast iron, carbon steel for a machine structure, or alloy steel, is used for the member made of an iron base material, or the shaft in the present invention. The sliding material is first subjected to oxynitriding in a gas mixture of ammonia gas and air of 0.5-6 volume % under pressure of 100-200 mmAq, at 450-650° C., for a period of 15 minutes-3 hours, thereby to uniformly form near the surface thereof an oxynitride layer which consists of a mixture layer comprising iron nitride and iron oxide mixed therewith in a granular form, and an iron nitride layer integral with the mixture layer thereunder. Then, steam treatment is applied to the oxynitride layer in steam (water vapor) having pressure of 100-200 Aq, at 300-800° C., for a period of 15 minutes to 2 hours, thereby to oxidize the iron nitride on the surface of the oxynitride layer. As a result, as shown in FIGS. 4 and 5, there are formed both a mesh-like porous iron oxide film 21 which mainly containing chemically stable $Fe_3O_4$ with a thickness of 0.05-10 μm and which includes a number of vacancies and pores ranging 0.1-1 μm in size at a rate of 10-50%, and an oxynitride layer 22 (a mixture layer 27 with a thickness of 0.01-2 μm + an iron nitride layer 28 with a thickness of 1-20 μm) formed between the iron oxide film 21 and a substrate of the member made of an iron base material or the shaft in an integrated state therewith. With this structure, the surroundings of graphite are reinforced by the oxynitride layer, and the portions of graphite serve as solid lubrication holes and rigid oil regaining holes. The tri-iron tetroxide has a hardness of HV300-600 and the underlying oxynitride layer has a hardness of HV600-1300, thereby providing the sufficient strength. Thus, the member made of an iron base material or the shaft has the strength and the mechanical property enough to meet the above-mentioned severe lubrication conditions necessary for the sliding structure and the compressor.

A material of a member slidably contacted with another member made of an iron base material, or a material of the bearing would cause wear and adhesion and hence this member is apt to be inferior regarding seizure resistance, if it is conventionally formed of cast iron and an iron base sintered material. Therefore, in the present invention there is used a member or a bearing provided on the sliding surface thereof with a porous ceramic layer which is higher in hardness and more excellent in seizure resistance than metal base materials.

Ceramic may be any of materials of carbide, oxide, nitride and etc. As to ceramic to be combined with the above-mentioned shaft, silicon carbide (α- and β-SiC) is preferable among the carbide materials. Silicon nitride, aluminum nitride and sialon are preferable among the nitride materials. Alumina and zirconia are preferable among the oxide materials. Furthermore, a mixture material of carbide, nitride and oxide, as well as a composite material added with a metal which becomes a binder upon reaction with ceramic particles are also preferable.

The above ceramic, mixture material of ceramics, or composite material of ceramic and metal is applied in a manner explained below. A mass of powder ranging 2-10 μm in grain size is sintered under atmospheric pressure, at about 2000° C., into a sintered body. By casting iron around the outside of the sintered body to form a backing metal, or by employing the single substance of the sintered body in itself, the bearing is fabricated which has a surface layer formed of the ceramic layer or the mixture or composite material with a thickness of 0.5-10 mm. The surface layer in any form exhibits the vacancy rate of 1-50 volume %, preferably 5-20 volume %. This facilitates retaining of oil and formation of an oil film, and hence improves wear resistance. In the case of the bearing which uses a backing metal, the ceramic sintered material may be joined to the backing metal by shrink fitting other than the casting of iron around it. The bearing using the ceramic, the mixture material of ceramics, or the composite material of ceramic and metal may be fabricated by employing either one alone, or forming thin layers of plural ones on the surface of an appropriate substrate made of an iron base material or the like.

As to the boundary between the shaft acting as a sliding member of a compressor, which shaft is provided on the uppermost surface portion thereof with porous oxide film mainly containing tri-iron tetroxide and the underlying oxynitride layer, and the bearing combined with the shaft, it is essential to consider prevention of seizure and wear caused by adhesion and abrasion, and it is required to provide a material combination that shows the coefficient of friction as low as possible.

Figure 1:
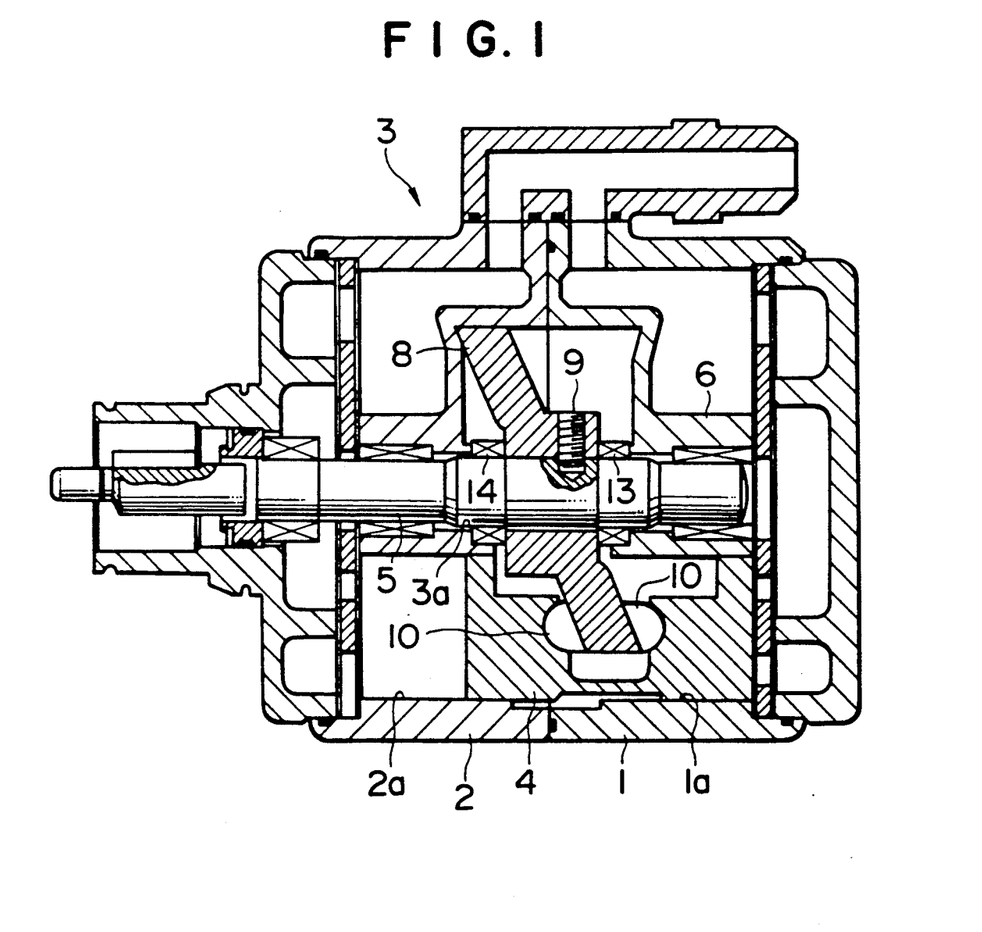
FIG. 1 is a schematic sectional view of a compressor of swash plate type.
Figure 2:
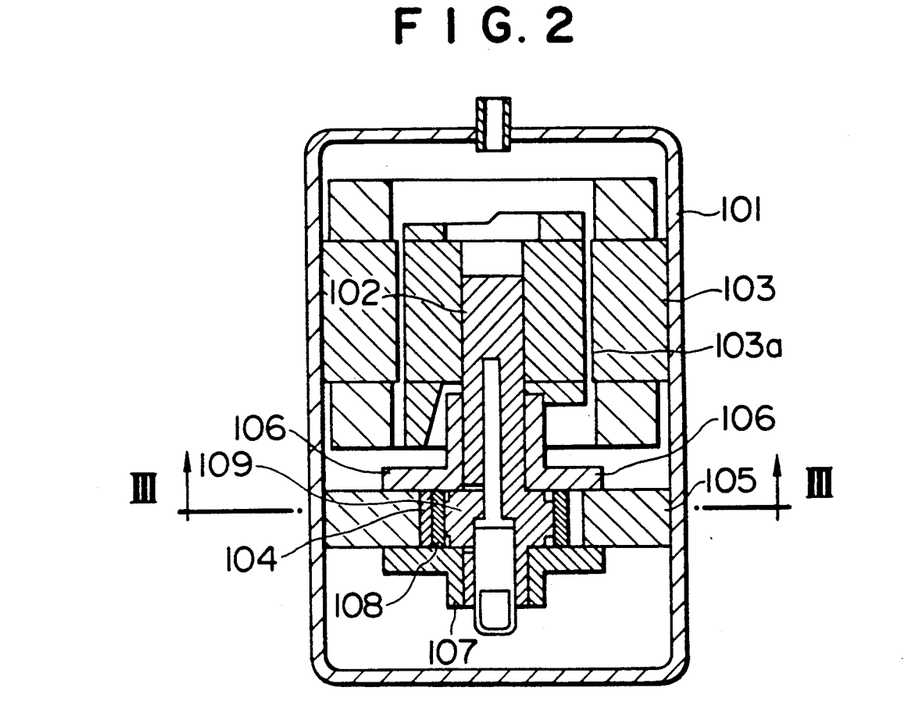
FIG. 2 is a schematic sectional view of a rotary compressor.
Figure 3:
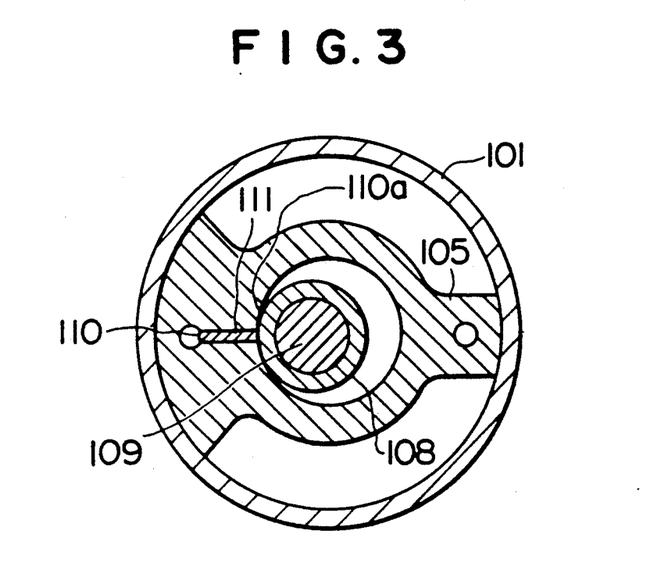
FIG. 3 is a sectional view taken along the line III—III in FIG. 2.

By way of example, a compressor of swash plate type as shown in FIG. 1 is applied to car coolers, etc., and a rotary compressor as shown in FIGS. 2 and 3 is applied to refrigerators, air conditioners, etc. The material combination of shaft and bearing in a compressor of the present invention is applied to the sliding portion constructed by a combination of a drive shaft 5 and thrust bearings 13, 14 in the former compressor, or constructed by a combination of a pin member 109 of a crankshaft and a roller 108, as well as of a crankshaft 102, an upper bearing 106 and a lower bearing 107 in the latter compressor.

Corresponding to a recent tendency toward smaller size and higher performance of room air conditioners and refrigerators, the sliding members have come to be operated over a wide range from a low speed to a high speed with adoption of a rotational speed control system. Particularly, in the combination of the pin member 109 of the crankshaft and the roller 108, as well as of the crankshaft 102, the upper bearing 106 and the lower bearing 107, the problem incidental to boundary lubrication is apt to occur. However, that problem can be overcome by adopting the combination of the sliding members of the present invention.

Compressors for use in refrigerators, air conditioners, car coolers, etc. are subjected to very severe working conditions, while being in a low speed rotation, for reduction in a temperature-raising period of time with respect to the temperature in the buildings or houses, or for reduction in a defrosting period of time in the case of air conditioners, for example. At this time, it takes time for a refrigerating machine oil (mixture oil of lubricant and coolant) to fully spread and reach the friction surfaces between a shaft and a bearing, and the compressor is obliged to operate in the boundary lubrication region along with metal-to-metal contact. This may cause heavy wear and hence adhesion thereby eventually disabling operation. With the present invention, however, by employing a combination of the shaft, which is provided with bath the porous oxide film mainly containing tri-iron tetroxide on the uppermost surface portion of its sliding face and the underlying oxynitride layer, and the bearing which has the sliding face formed of a ceramic sintered material or has a thin layer of a ceramic sintered material formed on the substrate surface, a refrigerating machine oil of low viscosity with Freon dissolved therein can be retained in the iron oxide film in the form of a porous layer under the severe boundary conditions, the penetration action can promote recovery from the insufficient oil film existence at an earlier time and ensure excellent retainability of an oil film, and the oil film can be well compatible with a configuration of the sliding face of the counterpart to thereby being about intimate contact therebetween, thereby alleviating the load face pressure so that disablement of operation can be prevented. The iron oxide film is less susceptible to solid-solution or diffusion with respect to ceramic, making it possible to prevent adhesion and seizure of the friction face. Furthermore, because of chemical stability, the above-mentioned respective layers can prevent degradation of a refrigerating machine oil even under the operating conditions of a high temperature and, therefore, act to make resistance for corrosion and wear in a greater degree.

In the case of using the ceramic bearing of the present invention, since ceramic is high in hardness and chemically stable, corrosion and wear are less apt to occur under the operating conditions of a high temperature, and heat resistance is excellent, along with advantageous effect of a less tendency to adhesion and seizure. In addition, the porous nature is effective to ensure high oil-retainability and rapid recovery from the insufficient oil film existence.

From the foregoing reasons, the combination of the shaft and the bearing according to the present invention enables to fully utilize advantages of both the members, significantly improve resistance to seizure, adhesion and wear, as well as the coefficient of friction even under severe boundary lubrication conditions of compressors owing to an interaction of both the members, and enhance the mechanical property as compressors and reliability thereof over a long period of time.

PREFERRED EMBODIMENTS OF THE INVENTION

Hereinafter, embodiments of the present invention will be described in detail.

Embodiment 1

In FIG. 1, designated by reference numerals 1, 2 are cylinder blocks symmetrical to each other in configuration. These two cylinder blocks 1, 2 are joined together to constitute a compressor body 3. The cylinder blocks 1, 2 respectively have three cylinder bores 1a, 2a in which a double-headed piston 4 is slidably fitted. A rotary shaft 5 is inserted through a central bore 3a of the compressor body 3 and is rotatably supported by bearings 6, 7. A swash plate 8 is fixed to the center of the rotary shaft 5 by a spring pin 9. When the swash plate 8 is rotated together with the rotary shaft 5, the resulting drive force is transmitted to the piston 4 via a slider the piston 4 is slidably reciprocated. The reference numerals 13, 14 donate thrust bearings.

Figure 10:
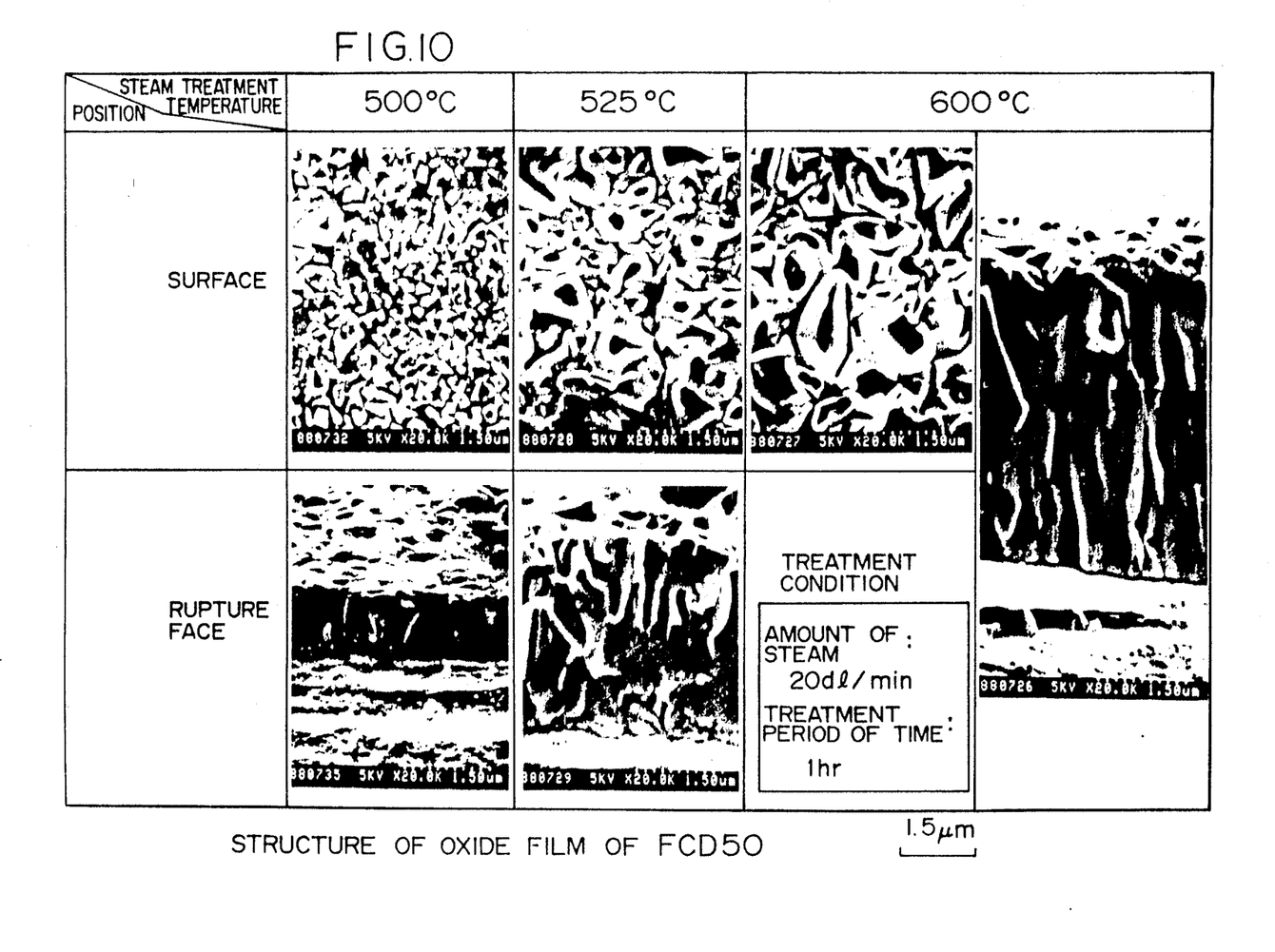
FIG. 10 is a SEM photograph of an oxide film and an oxynitride film obtained in Embodiment 1.

The rotary shaft 5 was fabricated as follows. A round bar (JIS: FCD50) of spheroidal graphite cast iron having compositions shown in Table 1 and a round bar of flaky graphite cast iron having compositions shown in Table 1 were machined to prepare two cast iron rods each of which has the same dimension as that rotary shaft. Then, these cast iron rods were held in a gas mixture of ammonia gas and air contained in the former in the rate of 6 volume % under pressure of 100-200 mmAq (gauge), at 540° C., for a period of 40 minutes, thereby to form an oxynitride layer around the entire rotary shaft with a thickness of about 25 μm. In the oxynitride layer, a mixture layer comprising iron oxide (inclusive of tri-iron tetroxide as a main ingredient and FeO, $Fe_2O_3$ in a few amounts) and iron nitride having a hardness of Hv 400-500 had a thickness of 0.05-1 μm in such a state that both are mixed with each other. Then, steam treatment was made by holding the cast iron rods with the oxynitride layers in steam (water vapor) at temperatures of 500° C., 525° C. and 600° C. for 60 minutes, to obtain rotary shafts having a tri-iron tetroxide ($Fe_3O_4$) layer 21 and an oxynitride layer 22 (i.e., a layer comprising a mixture layer 27 and an iron nitride layer 28) as shown in FIGS. 4 and 5. FIG. 10 shows scanning electron microscopic (SEM) photographs of the tri-iron tetroxide layer (surface and sectional fracture views. The tri-iron tetroxide layer 21 exhibited-mesh-like porous state having the vacancy rate of 40-50% in area percentage.

TABLE 1

|   | C | Si | Mn | P | S | Cr | Mo | Cu | Fe |
|---|---|----|----|---|---|----|----|----|----|
| A | 3.45 | 2.67 | 0.88 | 0.18 | 0.07 | 0.11 | 0.08 | 0.27 | Rest |
| (wt %) | | | | | | | | | |
| B | 3.2 | 2.3 | 0.8 | — | — | — | — | — | Rest |

A: Spheroidal graphite cast iron
B: Flaky graphite cast iron

Figure 6:
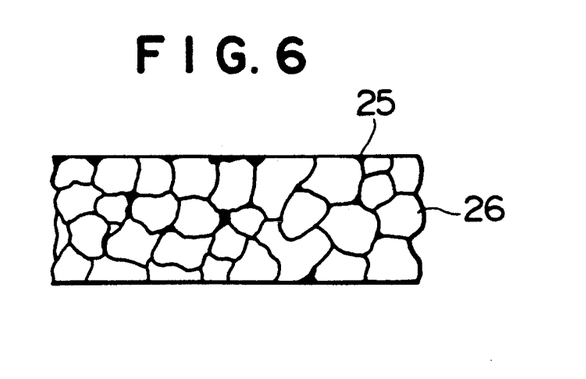
FIG. 6 is an illustrative view showing a ceramic layer on the bearing surface cooperating with the surface of a tri-iron tetroxide layer.

On the other hand, the bearing for supporting the rotary shaft was fabricated from a cyclindrical body formed by sintering powder of each of α-SiC, β-SiC, zirconia, silicon nitride, boron nitride, alumina and sialon to have the vacancy rate of about 10%, the powder ranging 2-10 μm in grain size. FIG. 6 shows the ceramic surface layer of the bearing in which 26 indicates a ceramic particle and 25 indicates a vacancy.

Figure 7:
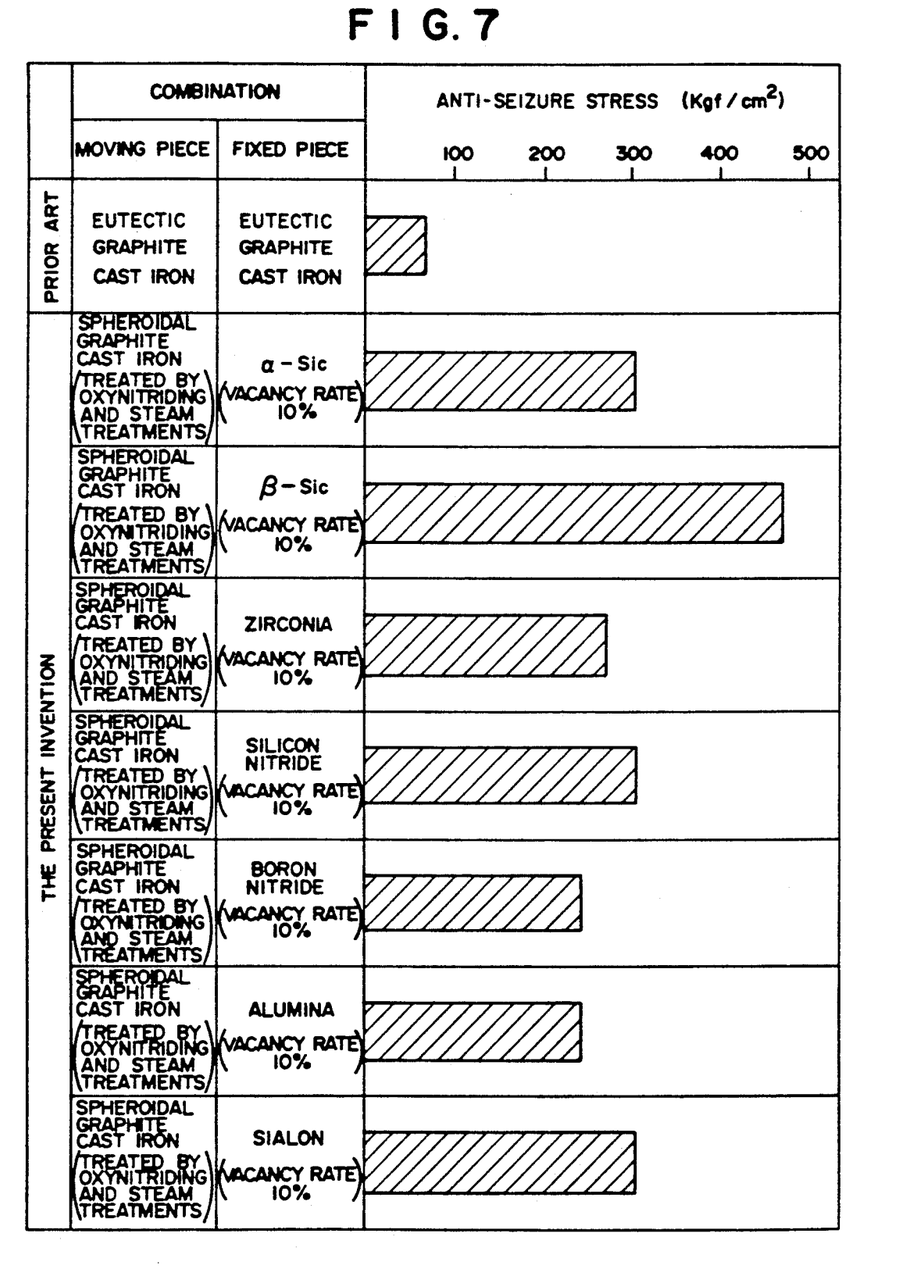
FIG. 7 is a graph showing the test result of seizure resistance.
Figure 8:
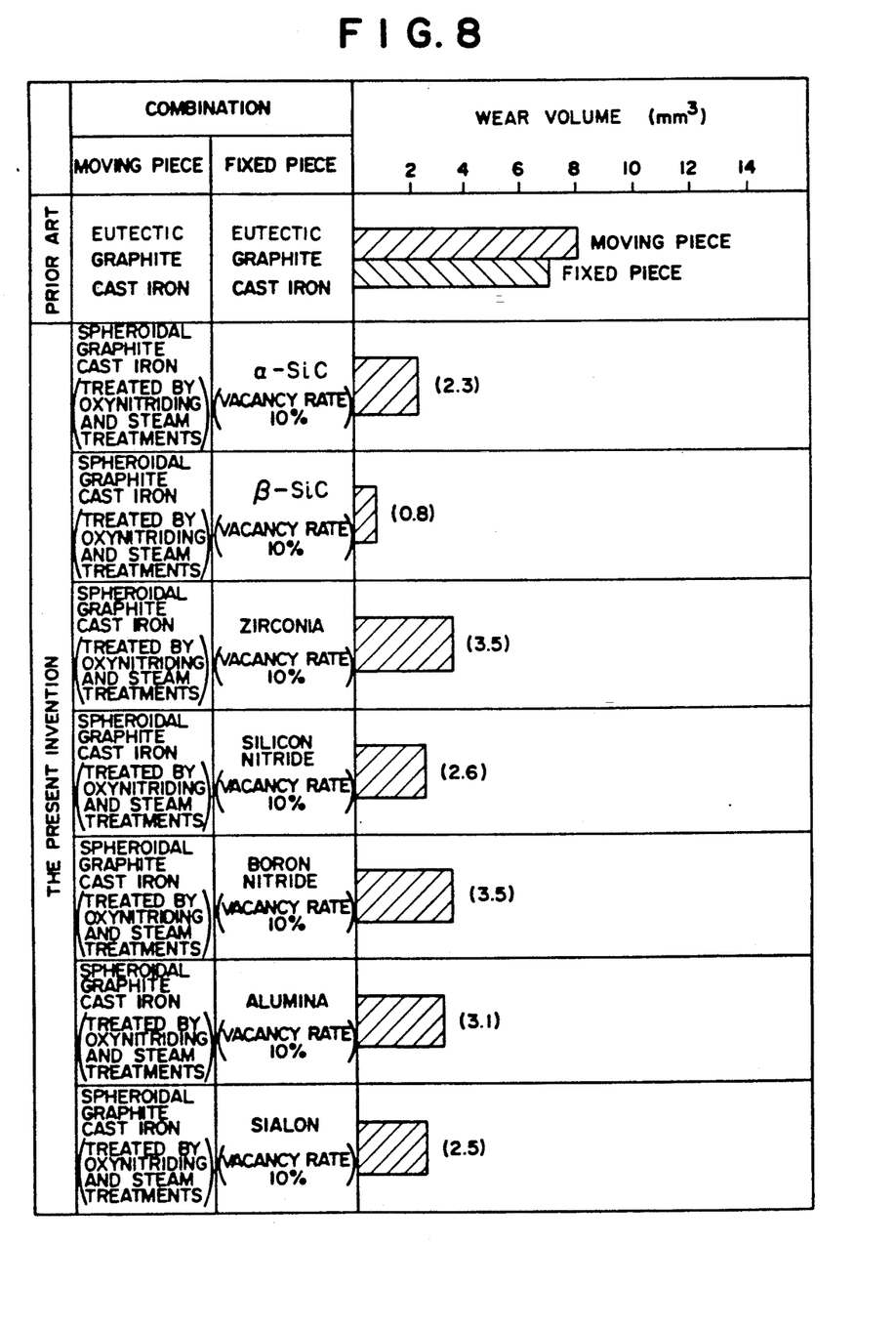
FIG. 8 is a graph showing the test result of wear resistance.
Figure 9A:
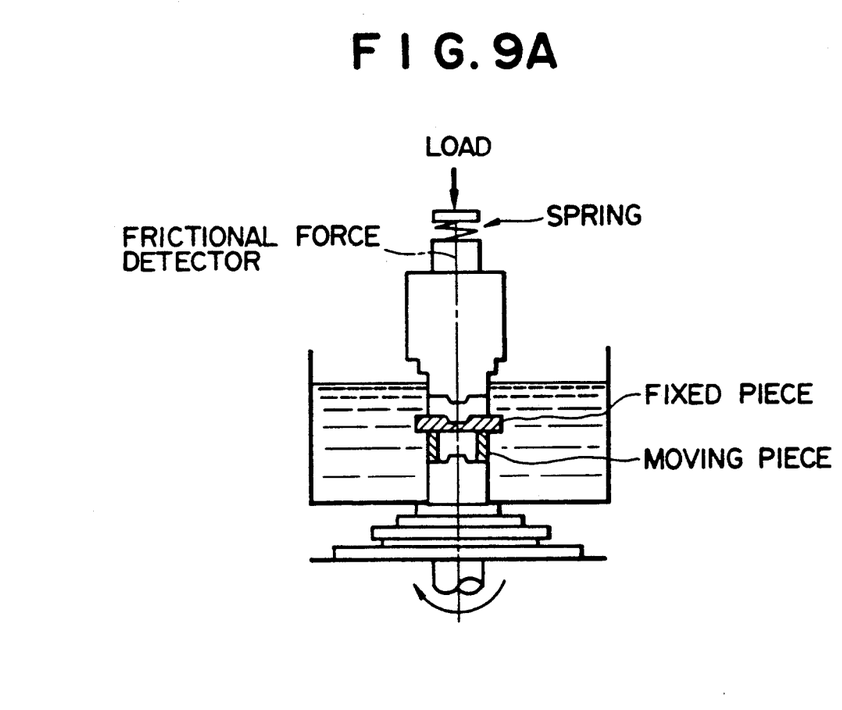
FIG. 9A is a sectional view showing a method of seizure test.
Figure 9B:
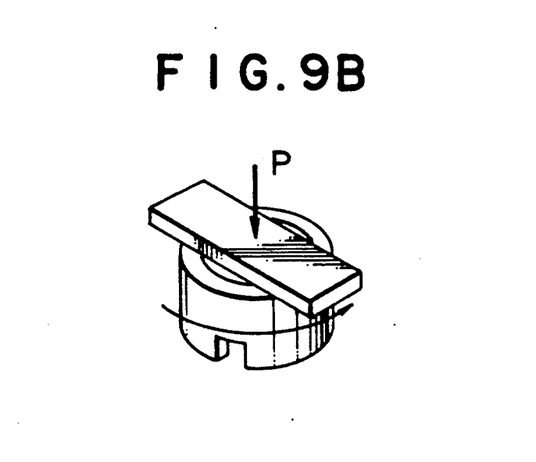
FIG. 9B is a perspective view showing a method of wear test.

Next, in order to test performance of compressors in a combination of the above-mentioned rotary shafts and bearings, cylindrical movable test pieces (corresponding to the rotary shafts) each having an inner diameter of 20 mm and a thickness of 2.8 mm and plate-like fixed test pieces (corresponding to the bearings) each being 10 mm (length)×40 mm (width)×5 mm (thickness) were fabricated by the same steps for those of the rotary shaft and the bearing, respectively, from spheroidal cast iron of the aforesaid rotary shaft and the same ceramic material as used in the aforesaid bearing, as well as eutectic graphite cast iron as a comparative material. Then, the seizure test shown in FIG. 9A and the wear test shown in FIG. 9B were conducted. The test results are shown in FIGS. 7 and 8, respectively. More specifically, FIG. 7 shows the result of the test in which the anti-seizure stress was determined while increasing the load at a circumferential speed of 10 m/s, in atmosphere of a naphthene base refrigerating machine oil as lubricant that was lowered in viscosity by dissolving Freon 113 $C_2C_{l3}F_3$ used as a compressed medium which Freon is gas under normal pressure. As will be apparent from the result, while the prior art combination of cast iron -cast iron showed the seizure face pressure of 75 kgf/cm$^2$, the combinations of the present invention showed the anti-seizure stress greater than 230 kgf/cm$^2$, namely as high as three times or more than the prior art value. It was also found that the combination of using β-Sic ceramic, in particular, showed the highest anti-seizure stress of 470 kgf/cm$^2$.

Shown in FIG. 8 is the test result of wear resistance. Looking at the result, it is found that any combinations of the present invention employing ceramic in the bushes have wear volume of less than 0.025 mm$^3$ per 1 mm$^2$ which is superior to the prior art combination.

From the above results, it is apparent that in the compressor using the combination of sliding members of the present invention, the lubricant of low viscosity with Freon dissolved therein is adsorbed to the porous iron oxide film so as to provide high oil-retainability and compatibility, increase resistance to adhesion and seizure of the sliding face both of which occur due to the insufficient oil film existence, and hence exhibit more excellent wear resistance characteristics than the prior art.

As seen from FIG. 7, β-SiC has the highest anti-seizure stress and the lowest wear volume. α-SiC and silicon nitride are excellent next to β-SiC. It is thus found that non-oxide ceramics have more preferable characteristics for the surface oxide layer of the movable piece. The combination using alumina is most inferior, but still remarkably superior to the prior art materials. Then, superiority is gradually increased in the order of zirconia, boron nitride and sialon. Stated otherwise, it is preferable to employ a ceramic layer on the sliding member different in material property from the counterpart member, specifically, to use non-oxide ceramic regarding an oxide material.

Embodiment 2

FIGS. 2 and 3 shows a rotary compressor generally used in refrigerating chambers, air conditioners, etc. In FIGS. 2 and 3, designated by 101 is a sealed container, 102 is a crankshaft, 103 is a electric motor section, and 104 is a compressor section. The compressor section 104 comprises, as shown in FIG. 2, a cylinder 105, an upper bearing 106, a lower bearing 107, a roller 108, a pin portion 109 of the crankshaft 102, and a vane 110. The crankshaft 102 is supported by the upper and lower bearings 106, 107 jointly constituting a journal bearing, and the crankshaft pin portion 109 eccentrically rotates the roller 108 upon sliding of the journal bearing. The vane 110 having its distal end slidably contacted with the outer periphery of the roller 108 is allowed via a thrust bearing to unidirectionally or reciprocatingly slide in a vane groove 111 formed in the cylinder 105 which receives the roller 108 therein.

The rotary shaft (crankshaft) 102 and the bearing constituted by the upper and lower bearings 106, 107 in the above-mentioned compressor were made to have the same structure as those in Embodiment 1. Atmosphere in the compressor was also the same as that in Embodiment 1.

Embodiment 3

Bearing materials each obtained by forming a ceramic sintered material in the form of a thin layer, having the vacancy rate of 10%, on the surface of graphite cast iron shown in FIGS. 4 and 5 by plasma-CVD (Chemical Vapor Deposition) and PVD (Physical Vapor Deposition) were used instead of the bearing materials in Embodiments 1 and 2. A shaft was the same as that in Embodiments 1 and 2. Among ceramics used in this embodiment, β-Sic was also most effective as β-SiC was most effective in the foregoing embodiments.

According to the compressor of the present invention, as mentioned above, since the shaft constituting the compressor has its sliding face formed of a porous iron oxide film and an underlying oxynitride layer, and the bearing of the shaft is formed of a porous ceramic sintered material, it becomes possible to improve retainability and penetration of an oil film, as well as resistance to adhesion and seizure even in a state of insufficient oil film existence of lubricant that is lowered in viscosity and that is diluted with Freon, or even during abnormal operating conditions caused by intrusion of foreign matters or the like. This results in an advantageous effect of significantly improving the mechanical property as a compressor and reliability thereof over a long period of time.

Furthermore, the present invention can also provide the similar advantageous effect when applied to any type of compressors, such as a reciprocating type, a rotary type, a screw type and a swash plate type, which operate by compressing Freon.

WHAT IS CLAIMED IS:

1. A sliding structure comprising a member made of an iron base material and another member having a porous ceramic layer slidably contacted with said iron base member, said iron base member being provided on the surface portion thereof opposed to said another member with a porous oxide film containing tri-iron tetroxide as a main constituent, and an oxynitride layer formed under said oxide film.

2. A sliding structure according to claim 1, wherein said member made of an iron base material is a rotary shaft and said another member having a porous ceramic layer is bearing for supporting said rotary shaft.

3. A sliding structure according to claim 1, wherein said iron base material is one selected from the group consisting of flaky graphite cast iron, eutectic graphite cast iron, spheroidal graphite cast iron, carbon steel for a machine structure, and alloy steel.

4. A sliding structure according to claim 1, wherein said porous oxide film containing $Fe_3O_4$ as a main constituent has the vacancy rate of 10-50% and a thickness of 0.05-10 μm.

5. A sliding structure according to claim 1, wherein said oxynitride layer consists of: a mixture layer positioned inside said porous oxide film which mixture layer is integrated with said porous oxide film, said mixture layer comprising both iron oxide inclusive of $Fe_3O_4$ as a main ingredient as well as FeO and $Fe_2O_3$ in a few amount and iron nitride in a state mixed with each other; and an iron nitride layer positioned inside said mixture layer which iron nitride layer is integrated with said mixture layer on this side and which iron nitride layer is also integrated with a substrate of said member of the iron base material on the other side.

6. A sliding structure according to claim 5, wherein said mixture layer has a thickness of 0.01-2 μm and said iron nitride layer has a thickness of 1-20 μm.

7. A sliding structure according to claim 6, wherein said ceramic layer has the vacancy rate of 1-50% and a thickness of 0.5-10 mm.

8. A sliding structure according to claim 1, wherein said another member having a ceramic layer is formed of a backing metal made of an iron base material and a ceramic layer joined to said backing metal, or is formed of a single substance of ceramic.

9. A sliding structure according to claim 1, wherein said ceramic layer is at least one selected from the group consisting of α-SiC, β-SiC, alumina, zirconia, silicon nitride, aluminum nitride, sialon, and boron nitride.

10. A compressor comprising a shaft made of an iron base material, compressing means for effecting compression action which means is coupled to said shaft, and a bearing for rotatably supporting said shaft, said shaft being provided on the surface portion thereof opposed to said bearing with a porous oxide film containing tri-iron tetroxide as a main constituent, and an oxynitride layer formed under said oxide film, said bearing being provided on the sliding surface thereof opposed to said shaft with a porous ceramic layer.

11. A compressor comprising a shaft made of an iron base material, compressing means for effecting compression action which means are coupled to said shaft, and a bearing for rotatably supporting said shaft, said shaft being provided on the surface portion thereof opposed to said bearing with a porous oxide film containing tri-iron tetroxide as a main constituent, and an oxynitride layer formed under said oxide film, wherein said bearing comprises upper and lower bearings, at least one of said upper and lower bearings being provided on the sliding face thereof opposed to said shaft with a porous ceramic layer.

12. A compressor according to claim 10 or 11, wherein said iron base material is one selected from the group consisting of flaky graphite case iron, eutectic graphite cast iron, spheroidal graphite cast iron, carbon steel for a machine structure, and alloy steel.

13. A compressor according to claim 10 or 11, wherein said porous oxide film containing $Fe_3O_4$ as a main constituent has the vacancy rate of 10-50% and a thickness of 0.05-10 μm.

14. A compressor according to claim 10 or 11, wherein said oxynitride layer has a mixture layer positioned inside said porous oxide film which mixture layer is integrated with said porous oxide film, said mixture layer comprising both iron oxide inclusive of $Fe_3O_4$ as a main ingredient as well as FeO and $Fe_2O_4$ in a few amount and iron nitride in a state mixed with each other, and an iron nitride layer positioned inside said mixture layer which iron nitride layer is integrated with said mixture layer on this side and which iron nitride layer is also integrated with a substrate of the shaft of the iron base material on the other side.

15. A compressor according to claim 14, wherein said mixture layer has a thickness of 0.01-2 μm and said iron nitride layer has a thickness of 1-20 μm.

16. A compressor according to claim 10 or 11, wherein said member having a ceramic layer is formed of a backing metal made of an iron base material and a ceramic layer joined to said backing metal, or is formed of a single substance of ceramic.

17. A compressor according to claim 10 or 11, wherein said ceramic layer has the vacancy rate of 1-50% and a thickness of 0.5-10 mm.

18. A compressor according to claim 10 or 11, wherein said ceramic layer is at least one selected from the group consisting of α-SiC, β-SiC, alumina, zirconia, silicon nitride, aluminum nitride, sialon, and boron nitride.

19. A rotary compressor comprising a crankshaft supported by upper and lower bearings jointly constituting a journal bearing, a roller eccentrically rotated by said crankshaft, a cylinder receiving said roller therein, and a vane freely slidably disposed in a vane groove formed in said cylinder, the distal end of said vane being held in slidable contact with the outer periphery of said roller, said crankshaft being made of an iron base material, said crankshaft being provided on the sliding surface portion thereof opposed to said bearing with a porous oxide film containing tri-iron tetroxide as a main constituent, and an oxynitride layer formed under said oxide film, said bearing for said crankshaft being provided on the sliding face thereof opposed to said crankshaft with a porous ceramic layer.

20. A rotary compressor comprising a crankshaft supported by upper and lower bearings jointly constituting a journal bearing, a roller eccentrically rotated by said crankshaft, a cylinder receiving said roller therein, and a vane freely slidably disposed in a vane groove formed in said cylinder, the distal end of said vane being held in slidable contact with the outer periphery of said roller, said crankshaft being made of an iron base material, said crankshaft being provided on the sliding surface portion thereof opposed to said bearing with a porous oxide film containing tri-iron tetroxide as a main constituent, and an oxynitride layer formed under said oxide film, at least one of upper and lower bearings jointly constituting said bearing being provided on the sliding face thereof opposed to said crankshaft with a porous ceramic layer.

21. A rotary compressor according to claim 19 or 20, wherein said iron base material is one selected from the group consisting of flaky graphite cast iron, eutectic graphite cast iron, spheroidal graphite cast iron, carbon steel for a machine structure, and alloy steel.

22. A rotary compressor according to claim 19 or 20, wherein said porous oxide film containing $Fe_3O_4$ as a main constituent has the vacancy rate of 10-50% and a thickness of 0.05-10.

23. A rotary compressor according to claim 19 or 20, wherein said oxynitride layer has a mixture layer positioned inside said porous oxide film which mixture layer is integrated with said porous oxide film, said mixture layer comprising both iron oxide inclusive of $Fe_3O_4$ as a main ingredient as well as FeO and $Fe_2O_3$ in a few amount and iron nitride in a state mixed with each other, and an iron nitride layer positioned inside said mixture layer which iron nitride layer is integrated with said mixture layer on this side and which iron nitride layer is also integrated with a substrate of the shaft of the iron base material on the other side.

24. A rotary compressor according to claim 23, wherein said mixture layer has a thickness of 0.01-2 $\mu$m and said iron nitride layer has a thickness of 1-20 $\mu$m.

25. A rotary compressor according to claim 19 or 20, wherein said member having a ceramic layer is formed of a backing metal made of an iron base material and a ceramic layer joined to said backing metal, or is formed of a single substance of ceramic.

26. A rotary compressor according to claim 19 or 20, wherein said ceramic layer has the vacancy rate of 1-50% and a thickness of 0.5-10 mm.

27. A rotary compressor according to claim 19 or 20, wherein said ceramic layer is at least one selected from the group consisting of $\alpha$-SiC, $\beta$-SiC, alumina-zirconia, silicon nitride, aluminum nitride, sialon, and boron nitride.

* * * * *